United States Patent
Tamura et al.

(10) Patent No.: US 12,113,817 B2
(45) Date of Patent: Oct. 8, 2024

(54) INFORMATION PROCESSING DEVICE AND INFORMATION PROCESSING METHOD

(71) Applicant: PANASONIC INTELLECTUAL PROPERTY MANAGEMENT CO., LTD., Osaka (JP)

(72) Inventors: Kento Tamura, Osaka (JP); Toshihisa Nakano, Osaka (JP); Kaoru Yokota, Hyogo (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 235 days.

(21) Appl. No.: 17/724,039

(22) Filed: Apr. 19, 2022

(65) Prior Publication Data
US 2022/0239686 A1 Jul. 28, 2022

Related U.S. Application Data

(63) Continuation of application No. PCT/JP2020/039194, filed on Oct. 16, 2020.

(30) Foreign Application Priority Data

Nov. 1, 2019 (JP) ................. 2019-199672

(51) Int. Cl.
*H04L 9/40* (2022.01)
*G07C 5/02* (2006.01)

(52) U.S. Cl.
CPC ............ *H04L 63/1425* (2013.01); *G07C 5/02* (2013.01)

(58) Field of Classification Search
CPC ....... H04L 63/1425; H04L 2012/40215; H04L 63/0227; G07C 5/02; G06F 21/577; G06F 21/606; G06F 21/71
See application file for complete search history.

(56) References Cited

U.S. PATENT DOCUMENTS 10,665,040 B2 * 5/2020 Colvin ................... G07C 5/085
10,673,880 B1 * 6/2020 Pratt ................... H04L 63/1425
(Continued)

FOREIGN PATENT DOCUMENTS

JP 2008-219149 9/2008
JP 2017-111796 6/2017
(Continued)

OTHER PUBLICATIONS

Li et al., "Development of integrated rule-based control and equivalent consumption minimization strategy for HEV energy management," 2016 12th IEEE/ASME International Conference on Mechatronic and Embedded Systems and Applications (MESA) Year: 2016 | Conference Paper | Publisher: IEEE.*

(Continued)

*Primary Examiner* — Roderick Tolentino
(74) *Attorney, Agent, or Firm* — Greenblum & Bernstein, P.L.C.

(57) ABSTRACT

A server includes: an obtainer that obtains items of information including an item of frame information regarding a communication frame transmitted on an in-vehicle network of each of a plurality of vehicles; and a generator that generates an integrated rule that is suitable for the items of information obtained by the obtainer and is for anomaly detection processing in the in-vehicle network of one of the vehicles; and a provider that outputs the integrated rule generated by the generator. For example, the obtainer obtains condition information indicating a condition pertaining to each of the plurality of vehicles at a time when the communication frame is transmitted on the in-vehicle network, and the generator generates the integrated rule using the items of frame information associated with the condition information.

11 Claims, 11 Drawing Sheets

(56) References Cited

U.S. PATENT DOCUMENTS

| | | | |
|---|---|---|---|
| 11,628,784 B2* | 4/2023 | Ben Noon | G06F 11/30 |
| | | | 340/426.1 |
| 2018/0115898 A1* | 4/2018 | Han | G01S 19/42 |
| 2018/0196941 A1* | 7/2018 | Ruvio | H04L 63/1425 |
| 2018/0295147 A1 | 10/2018 | Haga et al. | |
| 2018/0376305 A1* | 12/2018 | Ramalho de Oliveira | |
| | | | H04W 4/44 |
| 2019/0311556 A1* | 10/2019 | Thron | G07C 5/0808 |
| 2020/0036684 A1* | 1/2020 | Thompson | H04L 63/1416 |
| 2020/0137099 A1 | 4/2020 | Haga et al. | |
| 2020/0228550 A1* | 7/2020 | Ravindranathan | |
| | | | H04L 63/1425 |
| 2021/0203682 A1* | 7/2021 | Bajpai | H04L 63/0428 |

FOREIGN PATENT DOCUMENTS

| | | |
|---|---|---|
| JP | 2019-009617 | 1/2019 |
| JP | 2019-029993 | 2/2019 |

OTHER PUBLICATIONS

Wu et al., "A Satellite Fault Diagnosis Method Based on Focus Loss Function and Balance Factor," 2020 Chinese Automation Congress (CAC) Year: 2020 | Conference Paper | Publisher: IEEE.*

Office Action from Japan Patent Office (JPO) in Japanese Patent Appl. No. 2019-199672, dated Apr. 25, 2023, together with an English language translation.

* cited by examiner

| Date | Time | Weather | Speed [km/h] | Acceleration | Steering angle |
|---|---|---|---|---|---|
| 2019/8/2 | 8:40 | Fine | 45 | ... | ... |
| 2019/8/2 | 8:41 | Fine | 48 | ... | ... |
| ... | ... | ... | ... | ... | ... |
| 2019/8/3 | 8:40 | Rain | 33 | ... | ... |
| 2019/8/3 | 8:41 | Rain | 35 | ... | ... |
| ... | ... | ... | ... | ... | ... |

(a) Distribution of speeds in fine weather (b) Distribution of speeds in rainy weather

INFORMATION PROCESSING DEVICE AND INFORMATION PROCESSING METHOD

CROSS REFERENCE TO RELATED APPLICATIONS

This is a continuation application of PCT International Application No. PCT/JP2020/039194 filed on Oct. 16, 2020, designating the United States of America, which is based on and claims priority of Japanese Patent Application No. 2019-199672 filed on Nov. 1, 2019.

FIELD

The present disclosure relates to an information processing device and an information processing method.

BACKGROUND

An anomaly detecting device that detects unauthorized communication in an in-vehicle network is disclosed. An anomaly detecting device described in Patent Literature (PTL) 1 performs anomaly detection processing while switching rules according to a driving condition.

CITATION LIST

Patent Literature

PTL 1: Japanese Unexamined Patent Application Publication No. 2019-9617

SUMMARY

However, the anomaly detecting device according to PTL 1 can be improved upon.

In view of this, the present disclosure provides an information processing device capable of improving upon the above related art.

An information processing device according to an aspect of the present disclosure includes: an obtainer that obtains items of information including an item of frame information regarding a communication frame transmitted on an in-vehicle network of each of a plurality of vehicles; a generator that generates, using the items of information obtained by the obtainer, an integrated rule that is suitable for the plurality of vehicles and is for anomaly detection processing in the in-vehicle network; and an outputter that outputs the integrated rule generated by the generator.

It should be noted that these generic or specific aspects may be implemented as a system, a method, an integrated circuit, a computer program, or a computer-readable recording medium such as a CD-ROM, or as any combination of a system, a method, an integrated circuit, a computer program, and a recording medium.

The information processing device according to an aspect of the present disclosure is capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

Figure 1:
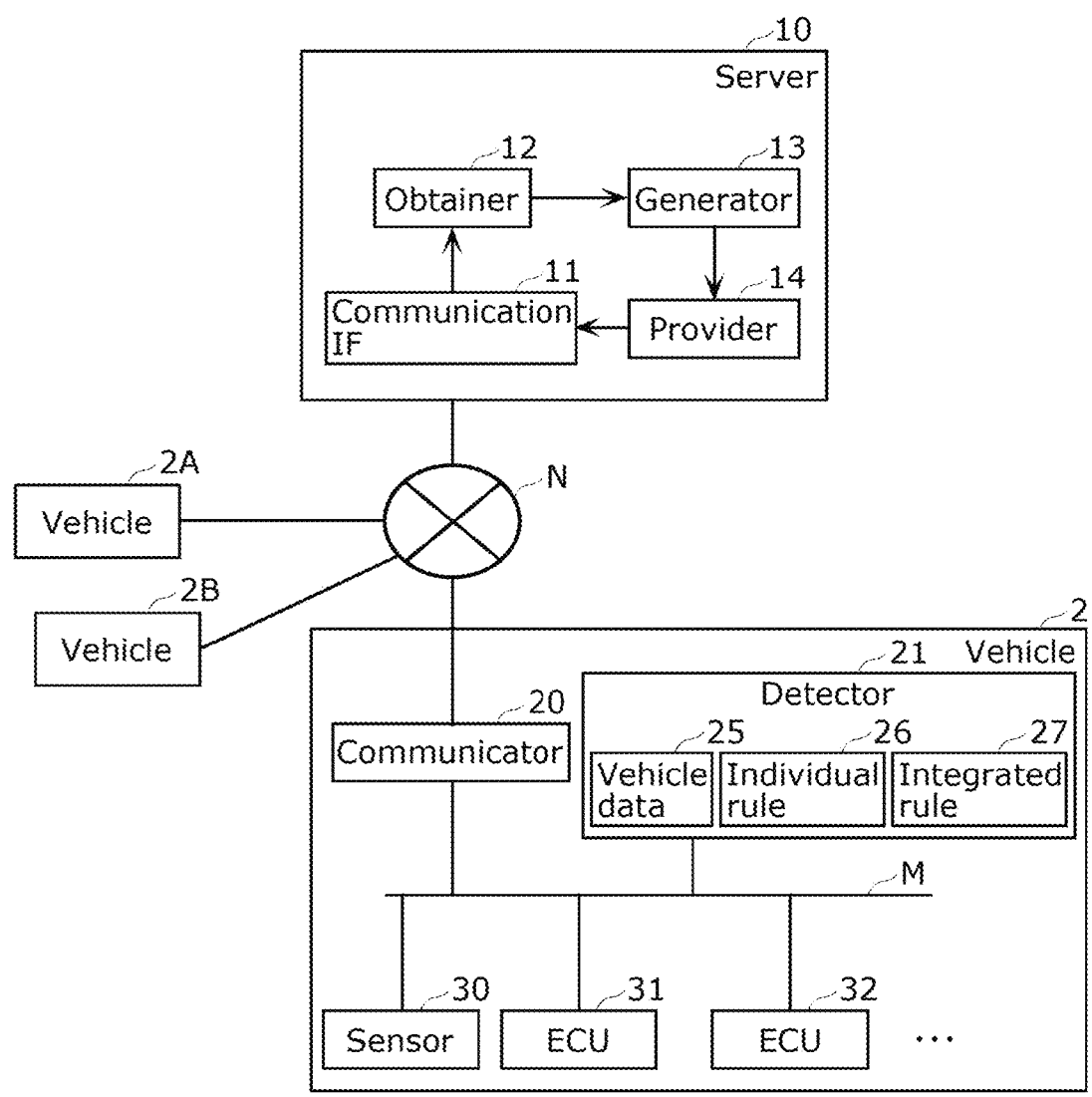
FIG. 1 is a block diagram illustrating a configuration of a processing system according to Embodiment 1.

DESCRIPTION OF EMBODIMENTS (Underlying Knowledge Forming Basis of the Present Disclosure)

The inventors have found the problem described below.

An anomaly detecting device that detects unauthorized communication in an in-vehicle network is disclosed.

However, there is a problem that it is not always possible to accurately perform rule-based anomaly detection.

In view of this, the present disclosure provides an information processing device that improves the accuracy of rule-based anomaly detection.

The information processing device according to the present disclosure produces the advantageous effect of improving the accuracy of rule-based anomaly detection.

An information processing device according to an aspect of the present disclosure includes: an obtainer that obtains items of information including an item of frame information regarding a communication frame transmitted on an in-vehicle network of each of a plurality of vehicles; a generator that generates, using the items of information obtained by the obtainer, an integrated rule that is suitable for the plurality of vehicles and is for anomaly detection processing in the in-vehicle network; and an outputter that outputs the integrated rule generated by the generator.

According to the above-described aspect, the information processing device generates an integrated rule based on a communication frame transmitted on an in-vehicle network of each of a plurality of vehicles and outputs the integrated rule generated. The integrated rule to be output is supposed to be used for the anomaly detection processing in an in-vehicle network of one of the vehicles. With this configuration, the anomaly detection processing in the one of the vehicles is performed using an integrated rule resulting from the anomaly detection processing based on a communication frame transmitted on an in-vehicle network of the one of the vehicles, as well as communication frames transmitted on in-vehicle networks of the plurality of vehicles, so that an accuracy of anomaly detection can be increased as compared to using a rule generated from only a communication frame transmitted on the in-vehicle network of one of the vehicles. In this manner, there is a possibility that the information processing device is capable of improving an accuracy of rule-based anomaly detection.

For example, the obtainer may obtain condition information indicating a condition pertaining to each of the plurality of vehicles at a time when the communication frame is transmitted on the in-vehicle network, and associates the condition information with the item of frame information. The generator may generate the integrated rule using the items of frame information associated with the condition information, among the items of information obtained by the obtainer. The outputter may output the condition information together with the integrated rule.

According to the above-described aspect, the information processing device generates an integrated rule associated with a condition pertaining to a vehicle at a time when the communication frame is transmitted, and outputs the integrated rule with the condition information associated with the integrated rule. The integrated rule being output is supposed to be used for the anomaly detection when a vehicle is under the condition indicated by the condition information that is output together with the integrated rule. The information processing device is therefore capable of further improving an accuracy of rule-based anomaly detection by selecting an appropriate rule according to a condition pertaining to a vehicle.

For example, the obtainer may obtain, as the item of frame information, (i) communication data indicating the communication frame transmitted on the in-vehicle network or (ii) log data of an in-vehicle device connected to the in-vehicle network. The generator may generate, as the integrated rule, a rule stipulating a condition to be satisfied by the communication data or the log data obtained by the obtainer.

According to the above-described aspect, the information processing device obtains, as items of information from vehicles, log data on communication frames transmitted on in-vehicle networks of the vehicles and generates, as an integrated rule, a condition to be satisfied by the log data obtained. The information processing device is therefore capable of improving an accuracy of the rule-based anomaly detection more easily by using the log data on the communication frames transmitted on the in-vehicle network.

For example, the obtainer may obtain, as the item of frame information, an individual rule generated based on the communication frame transmitted on the in-vehicle network, and the generator may generate, as the integrated rule, a rule obtained by integrating the individual rules obtained by the obtainer.

According to the above-described aspect, the information processing device obtains, as items of information from vehicles, individual rules generated by the vehicles and integrates the individual rules obtained to generate an integrated rule. The information processing device is therefore capable of improving an accuracy of the rule-based anomaly detection more easily by using individual rules generated by vehicles.

For example, when obtaining the item of frame information including the individual rule, the obtainer may obtain reliability information together with the individual rule, the reliability information indicating reliability of the individual rule obtained. When generating the integrated rule, the generator may generate the integrated rule with prioritized consideration given to an individual rule having higher reliability according to the reliability information obtained together with the individual rule, among the individual rules.

According to the above-described aspect, the information processing device uses reliabilities obtained together with individual rules to adjust a degree of contribution of each individual rule to the integration of the individual rules. The information processing device is therefore capable of improving an accuracy of the rule-based anomaly detection more easily by using individual rules generated by a plurality of vehicles with their appropriate contributions.

For example, the reliability information may include (i) a total number of items of data used in generating the individual rule or (ii) a total mileage of the vehicle, a total travel time of the vehicle, or a total amount of data transmitted by the vehicle.

According to the above-described aspect, the information processing device adjusts the degree of contribution of each individual rule by using a total number of items of data, a total mileage of a vehicle, a total travel time of the vehicle, or a total amount of data transmitted by the vehicle used for generating the individual rule, as reliability. The total number of items of data, the total mileage of a vehicle, the total travel time of the vehicle, and the total amount of data transmitted by the vehicle used for generating the individual rule are all types of information of which values increase as the vehicle is used for a longer time. Since the types of information that a vehicle conventionally holds are also used as reliability in this manner, the information processing device need not generate an additional type of information for calculating reliability. The information processing device is therefore capable of improving an accuracy of rule-based anomaly detection more easily by using the types of information that a vehicle conventionally holds for two purposes.

For example, the reliability information is may generated based on (i) a total number of items of data used in generating the individual rule or (ii) a total mileage of the vehicle, a total travel time of the vehicle, or a total amount of data transmitted by the vehicle.

According to the above-described aspect, the information processing device adjusts the degree of contribution of each individual rule by using reliability generated based on a total number of items of data, a total mileage of a vehicle, a total travel time of the vehicle, or a total amount of data transmitted by the vehicle used for generating the individual rule. The total number of items of data, the total mileage of a vehicle, the total travel time of the vehicle, and the total amount of data transmitted by the vehicle used for generating the individual rule are all types of information of which values increase as the vehicle is used for a longer time. Since the types of information that a vehicle conventionally holds are also used as reliability in this manner, the information processing device need not generate an additional type of information for calculating reliability. The information processing device is therefore capable of improving an accuracy of rule-based anomaly detection more easily by using the types of information that a vehicle conventionally holds for two purposes.

An information processing method according to an aspect of the present disclosure includes: obtaining items of information including an item of frame information regarding a communication frame transmitted on an in-vehicle network of each of a plurality of vehicles; generating, using the items of information obtained, an integrated rule that is suitable for the plurality of vehicles and is for anomaly detection processing in the in-vehicle network; and outputting the integrated rule generated.

According to the above-described aspect, the same advantageous effect as that of the above-described information processing device is produced.

It should be noted that these generic or specific aspects may be implemented as a system, a method, an integrated circuit, a computer program, or a computer-readable recording medium such as a CD-ROM, or as any combination of a system, a method, an integrated circuit, a computer program, and a recording medium.

Embodiments will be described in detail with reference to the drawings.

It should be noted that each of the subsequently described embodiments shows a generic or specific example of the present disclosure. Numerical values, shapes, materials, structural components, the arrangement and connection of the structural components, steps, and the processing order of the steps, etc., shown in each of the following embodiments are merely examples, and are therefore not intended to limit the scope of the present disclosure. Furthermore, among the structural components described in the following embodiments, structural components not recited in any one of the independent claims that indicate the broadest concepts are described as optional structural components.

Embodiment 1

In the present embodiment, an information processing device that improves accuracy of rule-based anomaly detection will be described. It should be noted that server 10 to be described later is an example of the information processing device.

FIG. 1 is a block diagram illustrating a configuration of a processing system according to the present embodiment.

As illustrated in FIG. 1, the processing system includes vehicles 2, 2A, and 2B (also referred to as vehicles 2) and server 10. Vehicles 2 and server 10 are connected to one another via network N so that vehicles 2 and server 10 can communicate with one another. Network N is an external network for server 10 and includes a mobile phone carrier network or the Internet.

Vehicle 2 is a vehicle, an automobile for example, that includes communicator 20, detector 21, sensor 30, and one or more electronic control units (ECUs) 31, 32, and the like. Functional units and devices in vehicle 2 are connected to in-vehicle network M so that the functional units and the devices can communicate with one another.

Sensor 30 is an in-vehicle device that performs sensing of surroundings of vehicle 2. Sensor 30 is, for example, a sensor that senses physical quantities of surroundings of vehicle 2 such as temperature, humidity, and brightness. Sensor 30 provides information indicating the sensed physical quantities to detector 21 via in-vehicle network M.

One or more ECUs 31, 32, and the like are in-vehicle devices being electronic control units that control controlled objects such as an engine, a steering wheel, brakes, and windows. One or more ECUs 31, 32, and the like are connected to their respective controlled objects and control their respective controlled objects. Further, one or more ECUs 31, 32, and the like are connected to in-vehicle network M and provide detector 21 with items of information regarding controlling of their respective controlled objects via in-vehicle network M.

Communicator 20 is a communication device that connects in-vehicle network M and network N. Communicator 20 includes a communication interface compatible with in-vehicle network M and a communication interface compatible with network N and transfer communication frames (also simply referred to as frames) from one to another.

Aside from one or more ECUs 31, 32, and the like, an information terminal or a diagnostic device can be connected to in-vehicle network M via a port (not illustrated).

A standard of in-vehicle network M is, for example, Controller Area Network (CAN), and the description will be given of a case where CAN is used; additionally, CAN with Flexible Data rate (CAN-FD), Local Interconnect Network (LIN), Media Oriented Systems Transport (MOST®), FlexRay®, Ethernet®, and the like can be used.

Detector 21 is a device that detects unauthorized communication that can be performed in in-vehicle network M as an anomaly and performs processing for the anomaly. Detector 21 is connected to in-vehicle network M.

Detector 21 accumulates and holds items of vehicle data 25 on vehicle 2. Vehicle data 25 includes communication data indicating a frame transmitted on in-vehicle network M, log data of the in-vehicle devices such as ECU 31, and the like. Further, detector 21 has, as rules for detecting unauthorized communication, individual rule 26 and integrated rule 27.

Individual rule 26 is a rule generated by detector 21 based on a frame that is generated based on a frame transmitted on in-vehicle network M. More in detail, individual rule 26 are rules generated for vehicle 2 being an individual vehicle and include a condition to be satisfied by content or timings of communications of the ECUs. Individual rule 26 is obtained in such a way that, for example, detector 21 analyzes frames transmitted on in-vehicle network M to obtain content or timings of communications of the ECUs in a normal condition and generates a condition to be satisfied by the content or timings of the communications of the ECUs in a form of a rule. As a method for the generation, various other methods can be employed.

Integrated rule 27 is a rule generated for a plurality of vehicles including vehicle 2 and includes a condition to be satisfied by content or timings of communications of the ECUs. Integrated rule 27 is obtained in such a way that, for example, server 10 obtains content or timings of communications of the ECUs in a normal condition based on information regarding frames that are transmitted on in-vehicle networks M of the plurality of vehicles 2 and collected from the plurality of vehicles, and that server 10 generates a condition to be satisfied by the content or timings of the communications of the ECUs in a form of a rule.

In vehicle 2, there is a possibility that unauthorized communication is performed from the information terminal or the diagnostic device via a port provided in in-vehicle network M. When unauthorized communication is performed, unauthorized control of, for example, an engine, a steering wheel, a brake, a window, or the like may be performed, or an unauthorized program may be sent to ECU 31 or the like, causing a further anomaly to occur. In view of this, detector 21 treats unauthorized communication in in-vehicle network M as an anomaly and uses a rule to detect the unauthorized communication and processes the unauthorized communication appropriately.

Vehicles 2A and 2B are each the same vehicle as vehicle 2 and operate independently of vehicle 2. It should be noted that the description will be made with vehicle 2 as typifying vehicles 2 but holds true for vehicles 2A, 2B, and the like.

Server 10 is a server device that performs information processing for controlling vehicles 2. Server 10 is connected to vehicles 2 via network N. Server 10 generates a rule for detecting unauthorized communication in vehicles 2 and transmits the rule to vehicle 2 via network N. The rule transmitted is obtained by vehicle 2 as integrated rule 27.

Server 10 will be described below more in detail.

As illustrated in FIG. 1, server 10 includes communication IF 11, obtainer 12, generator 13, and provider 14.

Communication IF 11 is a communication interface device to be connected to network N.

Obtainer 12 is a processor that obtains information regarding frames transmitted on in-vehicle networks M of vehicles 2. Obtainer 12 obtains one or more items of information including information regarding a frame transmitted on in-vehicle network M of each of one or more vehicles 2 via network N.

The information obtained by obtainer 12 may be, for example, communication data indicating a frame transmitted on in-vehicle network M of each of one or more vehicles 2 or may be log data of in-vehicle devices connected to in-vehicle network M described above; the description will be made about this case, but the information is not limited to this case. It should be noted that the communication data or the log data will be also referred to as vehicle data.

Generator 13 is a processor that generates, using the one or more items of information obtained by obtainer 12, an integrated rule that is suitable for the plurality of vehicles and is for anomaly detection processing in in-vehicle network M. Here, the rule suitable for the plurality of vehicles refers to a rule to be used by detectors 21 of the plurality of vehicles 2 for detecting unauthorized communication. Examples of the rule generated by generator 13 include a rule indicating whether information included in a frame transmitted on in-vehicle network M is normal or anomalous, a rule indicating a period or an interval of frames transmitted on in-vehicle network M, and the like.

Provider 14 is a processor that provides the rule generated by generator 13 to vehicles 2. Provider 14 provides the rule by transmitting the rule generated by generator 13 to each of vehicles 2 via network N. The rule provided is obtained by vehicle 2 as integrated rule 27. It should be noted that provider 14 corresponds to an outputter that outputs the rule generated by generator 13.

Here, obtainer 12 may obtain condition information indicating a condition at a time when the frame is transmitted on in-vehicle network M, and associate the condition with the above-described information. The condition information is information indicating a condition pertaining to vehicle 2 at a time when the frame is transmitted on in-vehicle network M or an ambient condition of vehicle 2, and includes, for example, weather, a speed, an acceleration, a steering angle, and the like.

For each item of the condition information obtained by obtainer 12, generator 13 extracts, among the one or more items of information obtained by obtainer 12, one or more items of information associated with the item of the condition information, as one or more items of extracted information, and uses the extracted one or more items of extracted information as the one or more items of information to generate a rule. Provider 14 then outputs the rule generated by generator 13 for each item of the condition information.

Processing by server 10 will be described below in detail with illustration of information and data used in the processing by server 10.

Figures 2, 3:
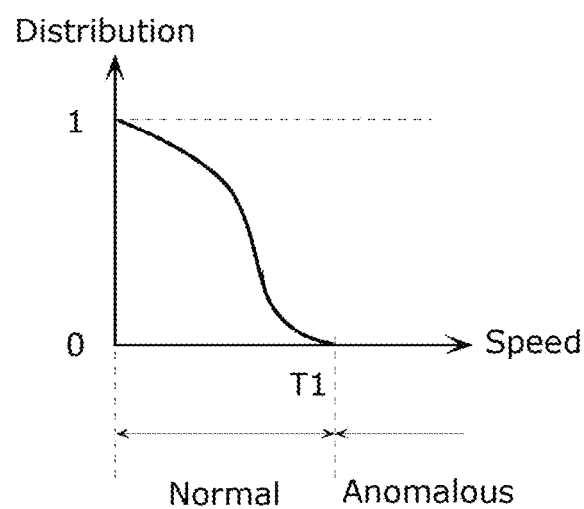
FIG. 2 is an explanatory diagram illustrating an example of log data according to Embodiment 1.
FIG. 3 is an explanatory diagram illustrating a first example of a distribution of speed of a vehicle according to Embodiment 1.

FIG. 2 is an explanatory diagram illustrating an example of vehicle data 25 according to the present embodiment. Vehicle data 25 illustrated in FIG. 2 is an example of log data of an in-vehicle device (sensor 30 or ECU 31, etc.) of vehicle 2.

As illustrated in FIG. 2, each entry of the log data includes a date, a time, and items of condition information. As an example of the items of condition information, weather, a speed, an acceleration, or a steering angle is illustrated.

The date is an item of information indicating a date at which a frame corresponding to the entry is generated.

The time is an item of information indicating a time at which the frame is generated.

The weather is an item of information indicating weather at a time when the frame is generated.

The speed is an item of information indicating a speed of vehicle 2 at the time when the frame is generated.

The acceleration is an item of information indicating an acceleration of vehicle 2 at the time when the frame is generated.

The steering angle is an item of information indicating a steering angle of vehicle 2 at the time when the frame is generated.

For example, an uppermost entry illustrated in FIG. 2 is generated at a date "Aug. 2, 2019" and a time "8:40" and indicates that a speed of vehicle 2 at the date and time is 45 km/h.

The log data is obtained by obtainer 12 via network N. Thereafter, based on the log data obtained, generator 13 generates a rule. A method for generating a rule without consideration given to condition information and a method for generating a rule with consideration given to condition information will be described below.

(1) Method for Generating a Rule without Consideration Given to Condition Information FIG. 3 is an explanatory diagram illustrating a first example of a distribution of speed of vehicle 2 according to the present embodiment. The distribution of speed illustrated in FIG. 3 illustrates a distribution of speed calculated by generator 13 based on log data obtained by obtainer 12 of server 10 from the plurality of vehicles 2. FIG. 3 is a distribution generated by normalizing the distribution of speed of the plurality of vehicles 2 such that a maximum value of the distribution becomes one.

Based on the distribution, generator 13 generates an upper limit of the speed in a form of a rule. For example, generator 13 generates the rule taking the maximum value of speed in the distribution as threshold value T1 of the speed. In this case, threshold value T1 of the speed is determined so that speed values included in the log data obtained by obtainer 12 all become equal to or less than threshold value T1.

The rule generated in this manner is used for detection of an anomaly by detector 21 of vehicle 2. Using the rule, detector 21 determines whether an anomaly occurs in vehicle 2 (i.e., vehicle 2 is anomalous) or not (i.e., vehicle 2 is normal) in a form of any one of two values. Specifically, when a speed value of vehicle 2 is less than threshold value T1, detector 21 determines that the speed of vehicle 2 is normal, and when the speed value is greater than threshold value T1, detector 21 determines that the speed of vehicle 2 is anomalous. At that time, when the speed value is equal to threshold value T1, the speed may be determined to be normal or may be determined to be anomalous.

It should be noted that generator 13 may determine threshold value T1 of the speed such that a bottom predetermined proportion (e.g., 95% or 99%) of speed values of the distribution are included.

Figure 4:
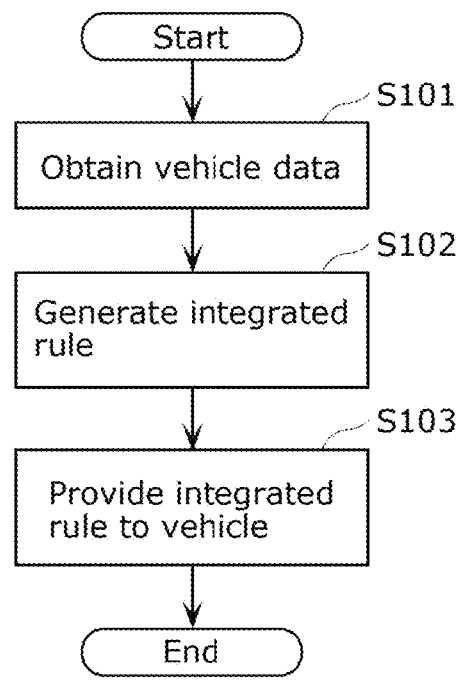
FIG. 4 is a flowchart illustrating a first example of processing by a server according to Embodiment 1.

FIG. 4 is a flowchart illustrating a first example of processing by server 10 according to the present embodiment. Specifically, the flowchart illustrated in FIG. 4 illustrates processing in which server 10 generates and outputs a rule without consideration given to information on weather in the log data illustrated in FIG. 2.

In step S101, obtainer 12 obtains vehicle data 25 that is a plurality of items of information including an item of frame information regarding a communication frame transmitted on in-vehicle network M of each of the plurality of vehicles 2.

In step S102, generator 13 generates, using the plurality of items of information obtained in step S101, an integrated rule that is suitable for the plurality of vehicles and is for anomaly detection processing in the in-vehicle network of vehicle 2.

In step S103, provider 14 provides the integrated rule generated in step S102 to vehicle 2.

Through a series of steps illustrated in FIG. 4, server 10 can improve an accuracy of the rule-based anomaly detection.

Figure 5:
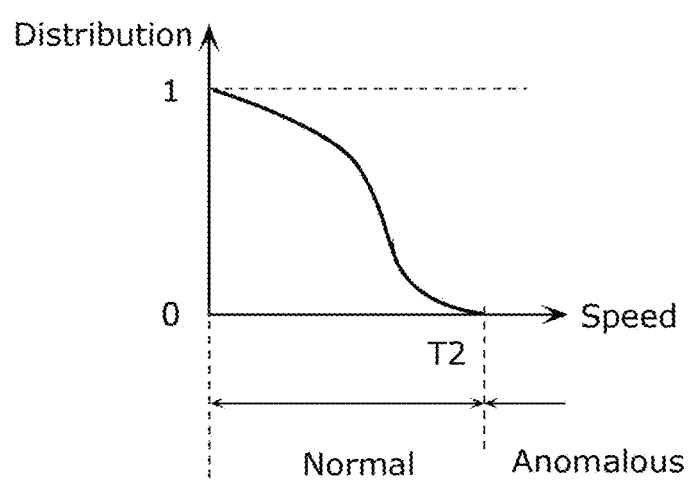
FIG. 5 is an explanatory diagram illustrating a second example of the distribution of speed of vehicles according to Embodiment 1.
Figure 5:
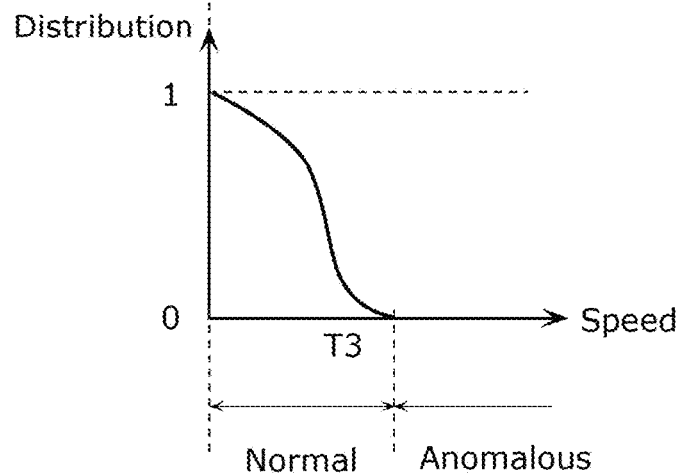

(2) Method for Generating a Rule with Consideration Given to Condition Information FIG. 5 is an explanatory diagram illustrating a second example of the distribution of speed of vehicle 2 according to the present embodiment. The distribution of speed illustrated in FIG. 5 illustrates a distribution of speed calculated by generator 13, after extracting items of log data from the log data obtained by obtainer 12 of server 10 from the plurality of vehicles 2 using items of information indicating weather as the items of condition information, for each item of condition information.

More specifically, (a) in FIG. 5 is a distribution generated by extracting entries in which weather is "fine" for speed values of the plurality of vehicles 2 and normalizing a distribution derived from the extracted entries such that a maximum value of the distribution becomes one.

In addition, (b) in FIG. 5 is a distribution generated by extracting entries in which weather is "rain" for speed values of the plurality of vehicles 2 and normalizing a distribution derived from the extracted entries such that a maximum value of the distribution becomes one.

Based on the distributions of (a) and (b) in FIG. 5, generator 13 generates an upper limit of the speed in a form of a rule for each item of condition information. For example, generator 13 generates the rule taking the maximum value of speed in the distribution illustrated in (a) in FIG. 5 as threshold value T2 of the speed. In this case, threshold value T2 of the speed is determined so that speed values included in the log data obtained by obtainer 12 all become equal to or less than threshold value T2. In addition, generator 13 generates the rule taking the maximum value of speed in the distribution illustrated in (b) in FIG. 5 as threshold value T3 of the speed. In this case, threshold value T3 of the speed is determined so that speed values included in the log data obtained by obtainer 12 all become equal to or less than threshold value T3.

It should be noted that generator 13 may determine threshold value T2 or T3 of the speed such that, as with threshold value T1 in (1) described above, a bottom predetermined proportion (e.g., 95% or 99%) of speed values of the distribution in (a) or (b) are included, respectively.

In a case where this method for generating a rule is used, information on weather in the log data is required.

Figure 6:
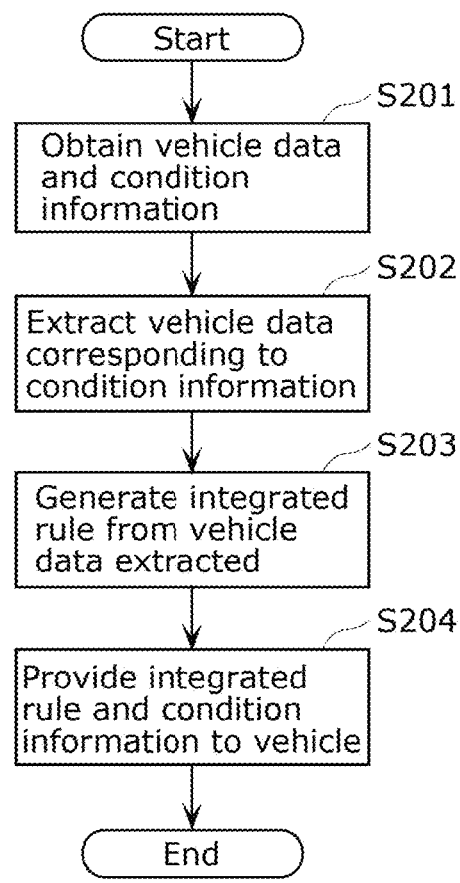
FIG. 6 is a flowchart illustrating a second example of processing by the server according to Embodiment 1.

FIG. 6 is a flowchart illustrating a second example of processing by server 10 according to the present embodiment. Specifically, the flowchart illustrated in FIG. 6 illustrates processing in which server 10 generates and outputs a rule with consideration given to information on weather in the log data illustrated in FIG. 2 as condition information.

In step S201, obtainer 12 obtains vehicle data 25 that is a plurality of items of information including an item of frame information regarding a communication frame transmitted on in-vehicle network M of each of the plurality of vehicles 2. At that time, obtainer 12 obtains condition information indicating a condition pertaining to each of the plurality of vehicles 2 at a time when the communication frame is transmitted on in-vehicle network M, and associates the condition information with the item of frame information.

In step S202, generator 13 extracts, from vehicle data 25 being the plurality of items of information obtained in step S201, vehicle data 25 corresponding to the condition information. Specifically, generator 13 extracts vehicle data 25 in which weather is "fine", and extracts vehicle data 25 in which weather is "rain".

In step S203, generator 13 generates an integrated rule from vehicle data 25 extracted in step S202.

In step S204, provider 14 provides the integrated rule generated in step S203 to vehicle 2, together with the condition information used for generating the integrated rule.

Through a series of steps illustrated in FIG. 6, server 10 can improve an accuracy of the rule-based anomaly detection with consideration given to condition information.

As described above, with the server being the information processing device according to the present embodiment, the information processing device generates an integrated rule based on communication frames transmitted on in-vehicle networks of a plurality of vehicles and outputs the integrated rule generated. The integrated rule to be output is supposed to be used for the anomaly detection processing in an in-vehicle network of one of the vehicles. With this configuration, the anomaly detection processing in the one of the vehicles is performed using an integrated rule resulting from the anomaly detection processing based on a communication frame transmitted on an in-vehicle network of the one of the vehicles, as well as communication frames transmitted on in-vehicle networks of the plurality of vehicles, so that an accuracy of anomaly detection can be increased as compared to using a rule generated from only a communication frame transmitted on the in-vehicle network of one of the vehicles. In this manner, the information processing device is capable of improving an accuracy of rule-based anomaly detection.

Further, the server generates an integrated rule associated with a condition pertaining to a vehicle at a time when the communication frame is transmitted, and outputs the integrated rule with the condition information associated with the integrated rule. The integrated rule being output is supposed to be used for the anomaly detection when a vehicle is under the condition indicated by the condition information that is output together with the integrated rule. The information processing device is therefore capable of further improving an accuracy of rule-based anomaly detection by selecting an appropriate rule according to a condition pertaining to a vehicle.

Further, the server obtains, as information from a vehicle, log data on communication frames transmitted on an in-vehicle network of the vehicle and generates a condition to be satisfied by the log data obtained as an integrated rule. The information processing device is therefore capable of improving an accuracy of the rule-based anomaly detection more easily by using the log data on the communication frames transmitted on the in-vehicle network.

Embodiment 2

In the present embodiment, an embodiment different from Embodiment 1 of an information processing device that improves an accuracy of rule-based anomaly detection will be described. Specifically, a method in which server 10 obtains individual rules 26 from vehicle 2 and generates an integrated rule using the individual rules obtained will be described.

As with Embodiment 1, obtainer 12 obtains items of information regarding frames transmitted on in-vehicle networks M of vehicles 2. In the present embodiment, the items of information obtained by obtainer 12 are individual rules generated based on the frames transmitted on in-vehicle networks M. In this case, generator 13 generates, as a rule, an integrated rule into which one or more individual rules included in one or more items of information obtained by obtainer 12 are integrated.

Here, when obtaining the items of information including the individual rules, obtainer 12 may obtain items of reliability information together with the individual rules, the items of reliability information each indicating reliability of the individual rule obtained. In this case, when generating the integrated rule, generator 13 generates the integrated rule based on reliability information that is obtained together with the individual rule. The reliability information includes, for example, a total number of items of data used in generating the individual rule or a total mileage of each of vehicles 2, a total travel time of each of vehicles 2, or a total amount of data transmitted by each of vehicles 2.

A concrete example of the individual rule obtained by obtainer 12 will be described below.

Figure 7:
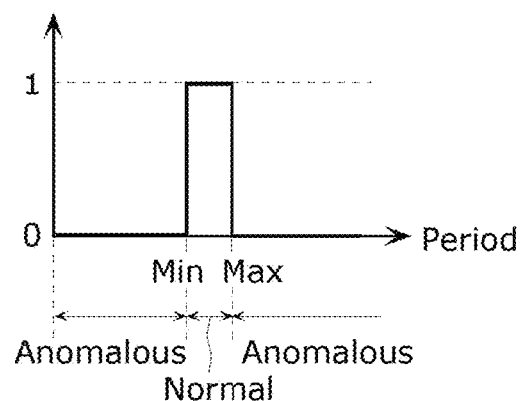
FIG. 7 is an explanatory diagram illustrating a first example of an individual rule for a period of communication in a vehicle according to Embodiment 2.

FIG. 7 is an explanatory diagram illustrating a first example of an individual rule for a period of communication in vehicle 2 according to the present embodiment. The individual rule illustrated in FIG. 7 is an individual rule that stipulates a maximum value (Max) and a minimum value (Min) of a range of a normal value for a period of frames regarding the communication. Using such an individual rule, detector 21 determines whether an anomaly occurs in vehicle 2 (i.e., vehicle 2 is anomalous) or not (i.e., vehicle 2 is normal) in a form of any one of two values.

With the individual rule illustrated in FIG. 7, when a period of frames transmitted on in-vehicle network M is determined to be within the range from the maximum value to the minimum value stipulated by the individual rule, detector 21 determines that the period has a normal value. In contrast, when the period of frames transmitted on in-vehicle network M is determined to be larger than the maximum value stipulated by the individual rule or smaller than the minimum value stipulated by the individual rule, detector 21 determines that the period has an anomalous value.

Figure 8:
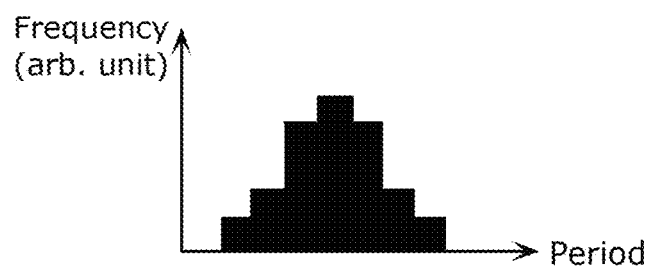
FIG. 8 is an explanatory diagram illustrating a second example of the individual rule for a period of communication in the vehicle according to Embodiment 2.

FIG. 8 is an explanatory diagram illustrating a second example of the individual rule for a period of communication in vehicle 2 according to the present embodiment. The individual rule illustrated in FIG. 8 is an individual rule that stipulates a histogram of periods of frames regarding the communication. It should be noted that frequencies of the histogram may be stipulated with significant numeric values or may be stipulated with relative values.

With the individual rule illustrated in FIG. 8, detector 21 determines whether a histogram of periods of a plurality of frames transmitted on in-vehicle network M matches the histogram stipulated by the individual rule within a range of a predetermined accuracy (e.g., 95% or 99%), and when determining that the histograms do not match each other, detector 21 determines that an anomaly occurs in the communication in in-vehicle network M.

Figure 9:
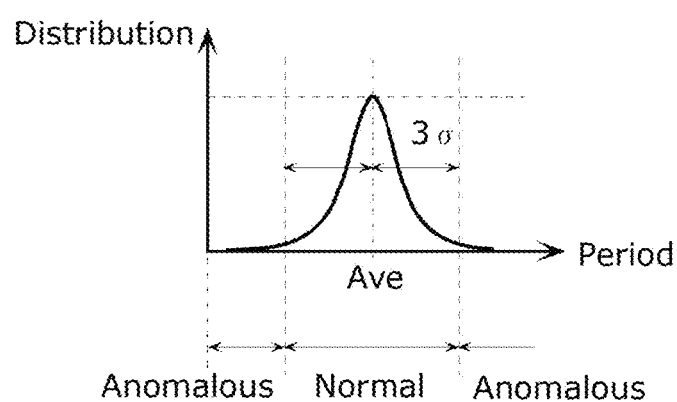
FIG. 9 is an explanatory diagram illustrating a third example of the individual rule for a period of communication in the vehicle according to Embodiment 2.

FIG. 9 is an explanatory diagram illustrating a third example of the individual rule for a period of communication in vehicle 2 according to the present embodiment. The individual rule illustrated in FIG. 9 is an individual rule that stipulates a distribution of periods of frames regarding the communication.

With the individual rule illustrated in FIG. 9, detector 21 determines whether a distribution of periods of a plurality of frames transmitted on in-vehicle network M matches the distribution stipulated by the individual rule within a range of a predetermined accuracy, and when determining that the distributions do not match each other, detector 21 determines that an anomaly occurs in the communication in in-vehicle network M.

Further, when a period of frames transmitted on in-vehicle network M is determined to be within a predetermined range from an average value (Ave) of the distribution stipulated by the individual rule, detector 21 can determine that the period has a normal value. It should be noted that the predetermined range can be set as, for example, a range of plus or minus 3σ, plus or minus σ, or the like from the average value (Ave). Here, σ denotes a standard deviation of the distribution.

A method for generating an integrated rule from individual rules will be described below.

Figure 10:
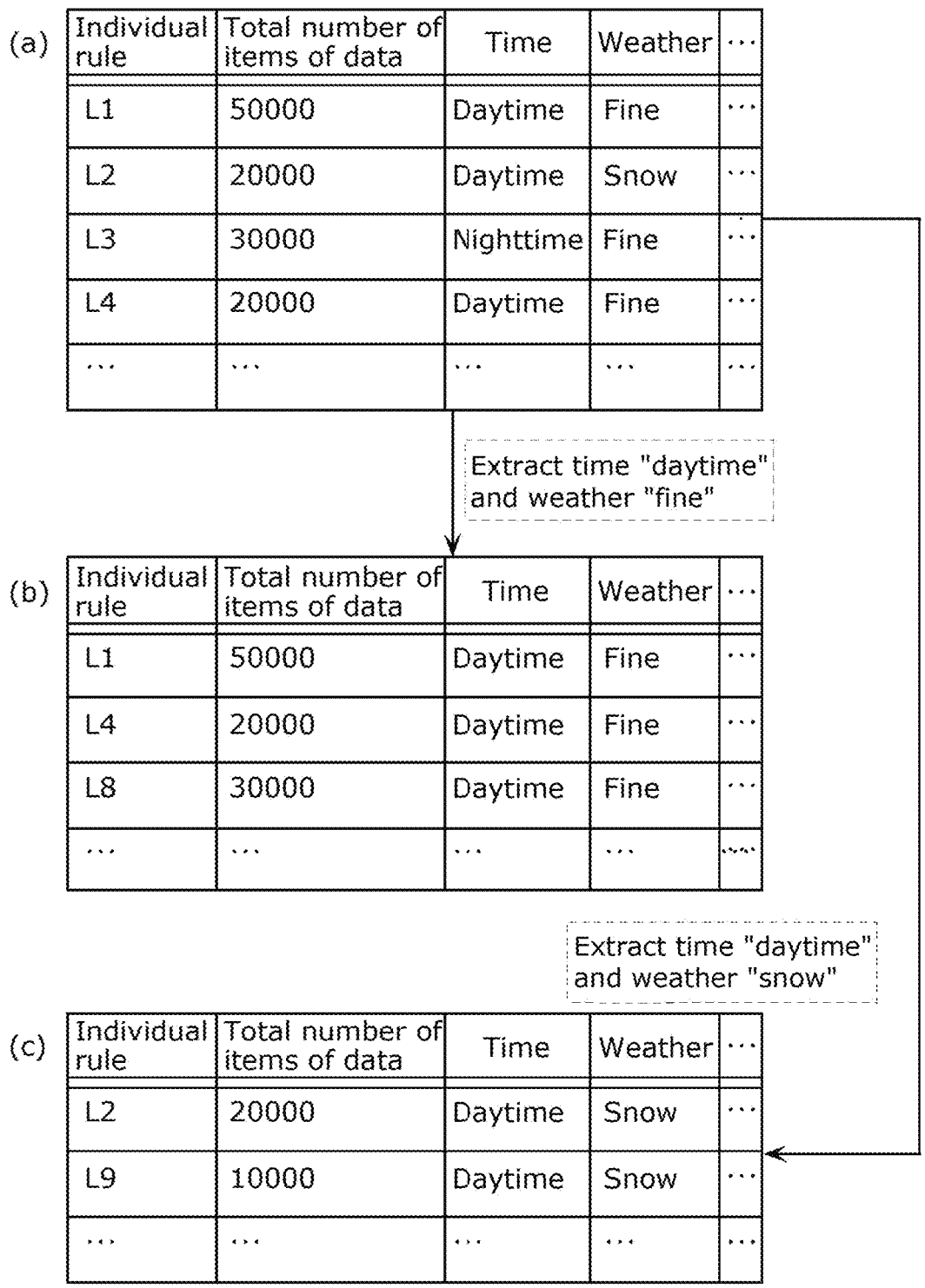
FIG. 10 is an explanatory diagram illustrating an example of individual rules and an example of extraction of individual rules according to Embodiment 2.

FIG. 10 is an explanatory diagram illustrating an example of individual rules and an example of extraction of individual rules according to the present embodiment. In FIG. 10, (a) illustrates a table that summarizes individual rules obtained by obtainer 12 from vehicles 2. Here, when obtainer 12 obtains an individual rule from vehicles 2, obtainer 12 also obtains the total number of entries of vehicle data 25 used for generating the individual rule and obtains a condition in which the individual rule is supposed to be applied (time, weather, etc.).

The table illustrated in (a) in FIG. 10 shows individual rule L1 that is to be applied when an individual rule obtained by obtainer 12 from vehicles 2 includes a time "daytime" and weather "fine". The total number of entries of vehicle data 25 (total number of items of data) used for generating individual rule L1 is 50000. Further, the table also shows individual rule L2 that is to be applied when an individual rule obtained by obtainer 12 from vehicles 2 includes a time "daytime" and weather "snow". The total number of entries of vehicle data 25 used for generating individual rule L3 is 30000. The same applies to the other individual rules.

A table illustrated in (b) in FIG. 10 shows individual rules obtained by extracting, from the individual rules obtained by obtainer 12 from vehicles 2, individual rules that are to be applied when a time is "daytime" and when weather is "fine" (i.e., individual rules L1, L4, and L8, etc.).

A table illustrated in (c) in FIG. 10 shows individual rules obtained by extracting, from the individual rules obtained by obtainer 12 from vehicles 2, individual rules that are to be applied when a time is "daytime" and when weather is "snow" (i.e., individual rules L2 and L9, etc.).

Figure 11:
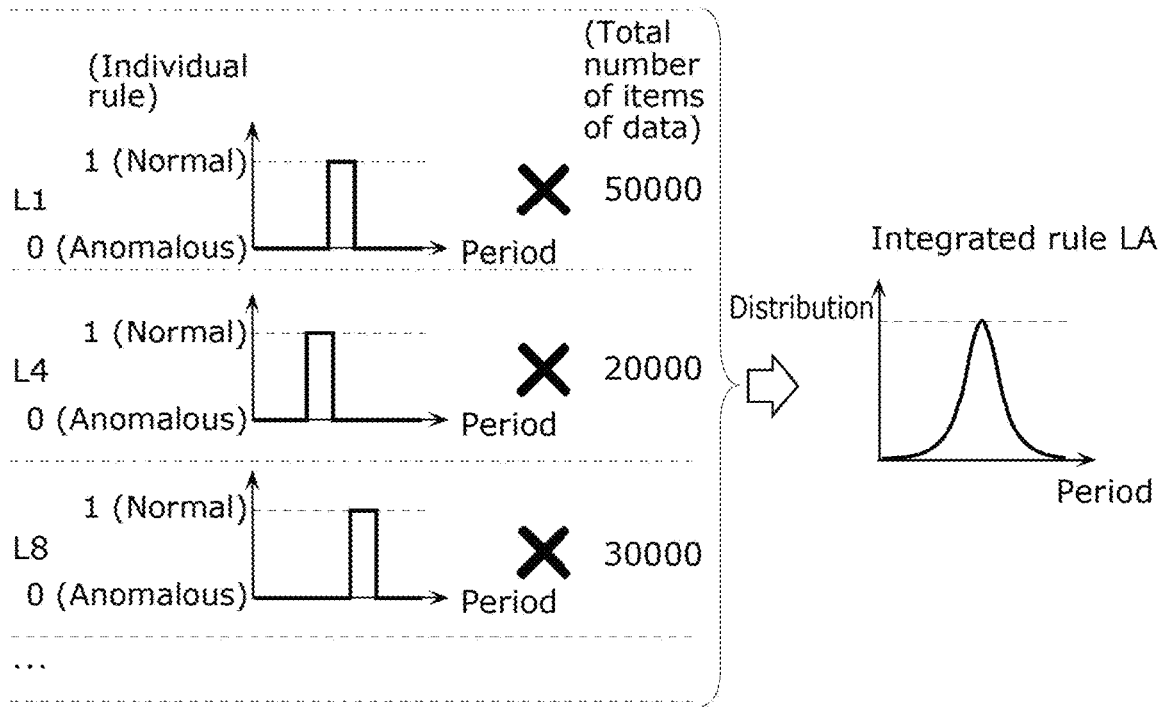
FIG. 11 is an explanatory diagram illustrating a first example of processing for generating an integrated rule from individual rules by a generator according to Embodiment 2.

FIG. 11 is an explanatory diagram illustrating a first example of processing for generating an integrated rule from individual rules by generator 13 according to the present embodiment. The processing illustrated in FIG. 11 is processing for generating an integrated rule from individual rules each stipulating a maximum value and a minimum value (see FIG. 7).

FIG. 11 illustrates, as an example, individual rules L1, L4, and L8 illustrated in (b) in FIG. 10. Generator 13 sums the individual rules with consideration given to the total number of items of data used for generating each individual rule as a weight, that is, produces a weighted sum of the individual rules to generate an integrated rule. Specifically, generator 13 produces the weighted sum by adding one to each value determined to be within a normal range by each individual rule and adding zero to each value determined to be within anomalous ranges by each individual rule, so as to derive a probability distribution of values of periods that are determined to be normal. Generator 13 uses the probability distribution thus derived as integrated rule LA.

It should be noted that, in place of the total number of items of data, a total mileage of vehicle 2, a total travel time of vehicle 2, or a total amount of data transmitted by vehicle 2 can be used as the weight used for generating the individual rule. As seen from the above, it can be said that the total number of items of data, the total mileage, the total travel time, and the total amount of data transmitted each indicate a degree of reliability of the individual rule, and therefore, the total number of items of data, the total mileage, the total travel time, or the total amount of data transmitted used as the weight used for generating the individual rule is also referred to as reliability.

Further, as the weight used for generating the individual rule, information generated based on a total mileage of vehicle 2, a total travel time of vehicle 2, or a total amount of data transmitted by vehicle 2 can be used. The information thus used as a weight for generating an individual rule is also referred to as reliability.

The integrated rule generated by generator 13 according to the method illustrated in FIG. 11 can be expressed with an average value and a standard deviation as with the individual rule illustrated in FIG. 9. Generator 13 may calculate an average value and a standard deviation of the integrated rule and may use the average value and standard deviation calculated as an integrated rule. Provider 14 provides the integrated rule thus obtained by generator 13 to vehicle 2 and the like.

Figure 12:
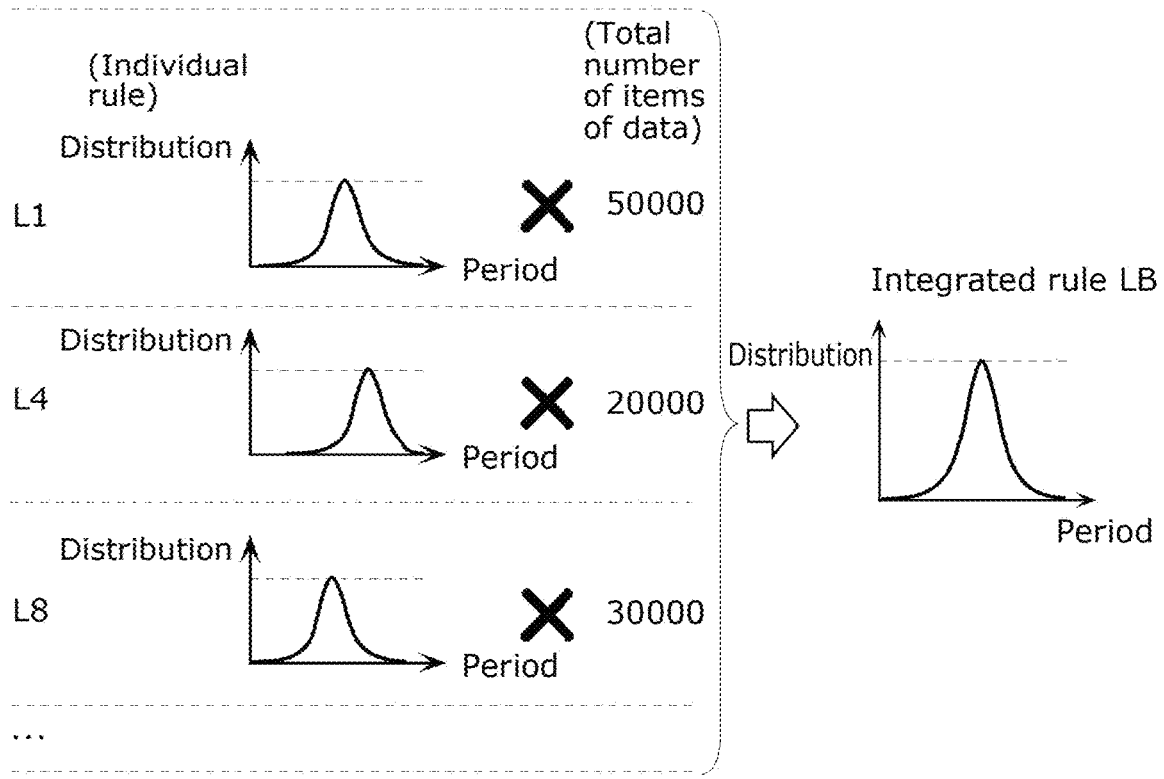
FIG. 12 is an explanatory diagram illustrating a second example of the processing for generating an integrated rule from individual rules by the generator according to Embodiment 2.

FIG. 12 is an explanatory diagram illustrating a second example of the processing for generating an integrated rule from individual rules by generator 13 according to the present embodiment. The processing illustrated in FIG. 12 is processing for generating an integrated rule from an individual rule stipulated by a distribution (i.e., an average value and a standard deviation) (see FIG. 9).

FIG. 12 illustrates, as an example, individual rules L1, L4, and L8 illustrated in (b) in FIG. 10. Generator 13 sums the individual rules with consideration given to the total number of items of data used for generating each individual rule as a weight, that is, produces a weighted sum of the individual rules to generate an integrated rule. Generator 13 uses the probability distribution thus derived as integrated rule LB.

Provider 14 provides the integrated rule thus obtained by generator 13 to vehicle 2 and the like as in the case illustrated in FIG. 11.

It should be noted that, in order to make a binary determination as to whether vehicle 2 is normal or anomalous, generator 13 may use a rule obtained by converting (or binarizing) the integrated rule, as the integrated rule.

Figure 13:
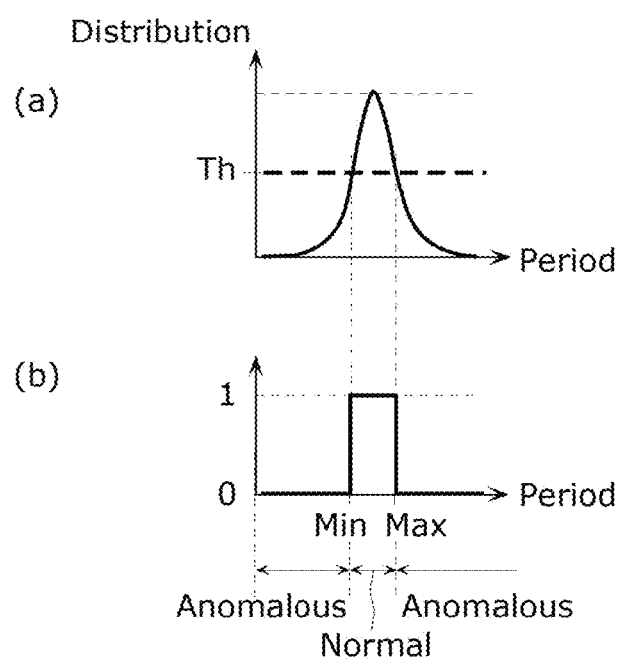
FIG. 13 is an explanatory diagram illustrating a first example of a method for binarizing an integrated rule according to Embodiment 2.

FIG. 13 is an explanatory diagram illustrating a first example of a method for binarizing an integrated rule according to the present embodiment.

A distribution illustrated in (a) in FIG. 13 is an integrated rule derived by the method illustrated in FIG. 11 or FIG. 12. Generator 13 generates a maximum value (Max) and a minimum value (Min) of a normal range of values of periods as an integrated rule. First, in the distribution illustrated in (a) in FIG. 13, generator 13 sets threshold value Th to a vertical axis of the distribution. Generator 13 then sets the maximum value and the minimum value of the normal range such that a range of values of periods of which distributions are equal to or greater than threshold value Th is determined to be normal and a value of a period of which a distribution is equal to or less than threshold value Th is determined to be anomalous. Specifically, in a graph illustrated in (a) in FIG. 13, generator 13 determines a value of a smaller one of periods of two intersections of a curve representing the distribution and a line representing threshold value Th as the minimum value of the normal range and determines a value of a larger one of the periods as the maximum value of the normal range (see (b) in FIG. 13).

By integrating a plurality of individual rules in this manner, detector 21 can improve the accuracy of rule-based anomaly detection.

It should be noted that the above description is given of an example in which a graph illustrating a distribution of speed or a distribution of period is used to make binary determination between normality and anomaly on an integrated rule, but the determination is not limited to the binary determination between normality and anomaly. That is, as a result of determination between normality and anomaly using an integrated rule, a continuous value or a discrete value representing a likelihood of normality or anomaly may be output. For example, a degree of anomaly may be expressed as a function that outputs any value from 0 to 1 or a value in tenths from 0 to 1. For example, although FIG. 9 illustrates an example of a binarized value that shows normality for being within a range of 3σ and anomaly for being out of the range of 3σ, a value that shows a degree of normality of 90% for being within a range of 1σ, a degree of normality of 80% for being within a range of 2σ, a degree of normality of 70% for being within a range of 3σ, and the like may be output. In this case, how to output the value can be changed according to a degree of normality (or anomaly). The same applies to individual rules.

Although the vertical axis of the distribution diagram illustrated in FIG. 9 or the like can be optionally set to probability, probability density, the number of items of data, or the like according to statistical processing on data from which an integrated rule or an individual rule originates.

Variation of Embodiment 2

In the present variation, a method for determination between normality and anomaly based on a plurality of items of information will be described.

Server 10 in the present variation obtains, with obtainer 12, a plurality of individual rules for determination between normality or anomaly based on, for example, two types of information including steering angle and vehicle speed and generates, based on the plurality of individual rules obtained, an integrated rule for determination of anomaly from a steering angle and a vehicle speed.

Figure 14:
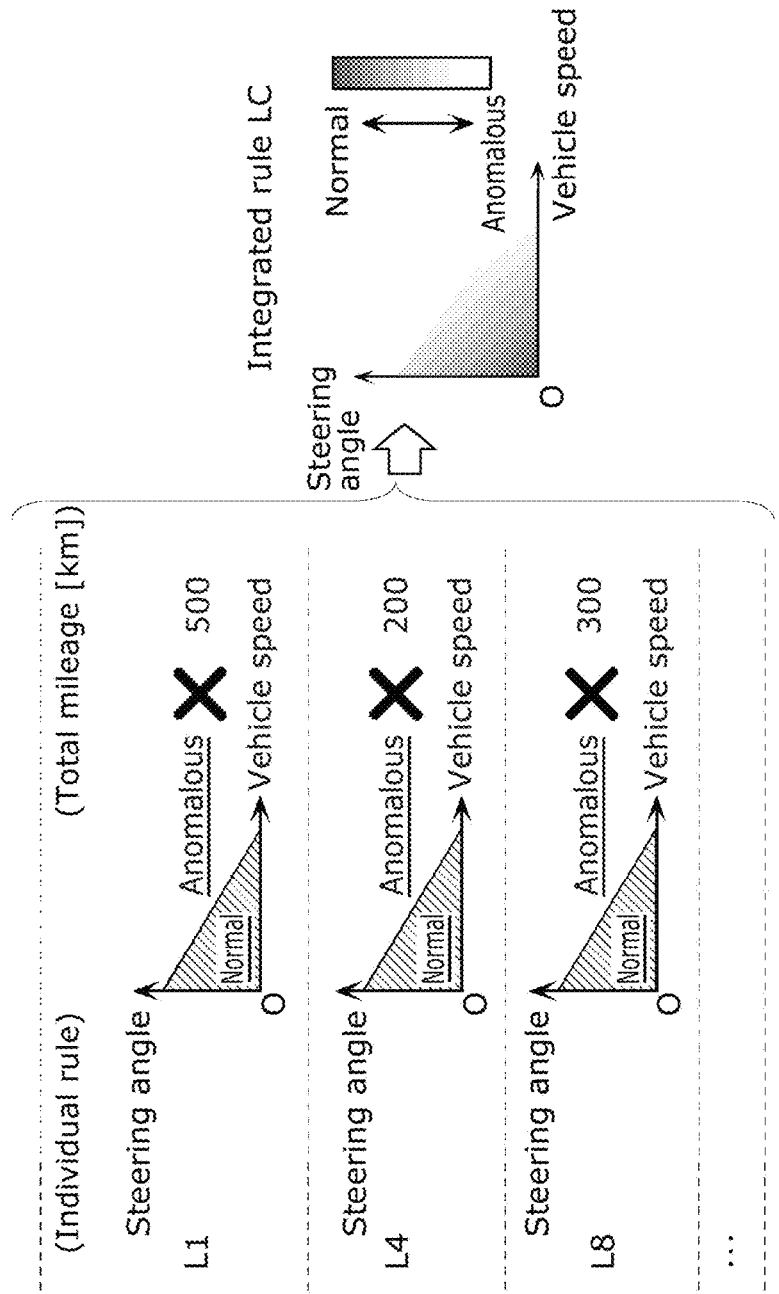
FIG. 14 is an explanatory diagram illustrating a third example of the processing for generating an integrated rule from individual rules by a generator according to a variation of Embodiment 2.

FIG. 14 is an explanatory diagram illustrating a third example of the processing for generating an integrated rule from individual rules by generator 13 according to the present variation. The processing illustrated in FIG. 14 is processing for generating an integrated rule from individual rules stipulated with steering angle and vehicle speed as the two types of information. Here, the two types of information will be expressed as "pair of items of information".

FIG. 14 illustrates, as an example, individual rules L1, L4, and L8 illustrated in (b) in FIG. 10. In each individual rule, when a pair of items of information including a steering angle and a vehicle speed is within a hatched region with a word "Normal", the pair of items of information is determined to be normal.

Generator 13 sums the individual rules with consideration given to the total mileage of vehicle 2 for which each individual rule is generated as a weight, that is, produces a weighted sum of the individual rules to generate an integrated rule. Specifically, generator 13 produces the weighted sum by adding one to a pair of items of information determined to be normal by each individual rule and adding zero to a pair of items of information determined to be anomalous by each individual rule, so as to derive a two-dimensional probability distribution of pairs of items of information that are determined to be normal.

Generator 13 uses the two-dimensional probability distribution thus derived as integrated rule LC. It should be noted that integrated rule LC is illustrated such that a higher probability distribution is represented with a darker color, as an example.

Provider 14 provides the integrated rule thus obtained by generator 13 to vehicle 2 and the like as in the case illustrated in FIG. 11.

It should be noted that, in order to make a binary determination as to whether vehicle 2 is normal or anomalous, generator 13 may use a rule obtained by converting (or binarizing) the integrated rule, as the integrated rule, as in the case of Embodiment 2.

Figure 15:
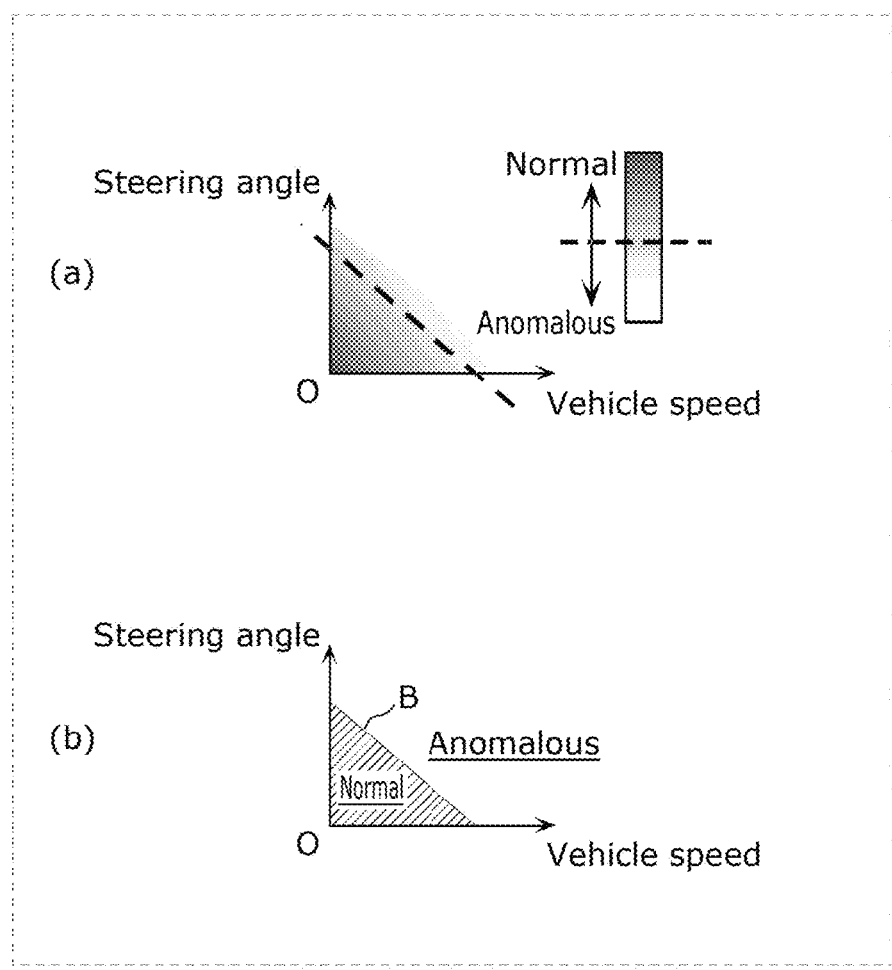
FIG. 15 is an explanatory diagram illustrating a second example of the method for binarizing an integrated rule according to the variation of Embodiment 2.

FIG. 15 is an explanatory diagram illustrating a second example of the method for binarizing an integrated rule according to the present variation.

A distribution illustrated in (a) in FIG. 15 is an integrated rule derived by the method illustrated in FIG. 14.

Generator 13 sets threshold value Th in a probability distribution of pairs of items of information. Generator 13 then sets a boundary to a plane such that a pair of items of information of which a probability distribution is equal to or greater than threshold value Th is determined to be normal and a pair of items of information of which a distribution is equal to or less than threshold value Th is determined to be anomalous. Specifically, in a graph illustrated in (a) in FIG. 15, generator 13 extracts a region where a pair of items of information is determined to be normal and a region where a pair of items of information is determined to be anomalous, and sets a boundary between these regions as boundary B (see (b) in FIG. 15). It should be noted that boundary B may be a curve while boundary B is expressed as a line in (b) in FIG. 15.

By integrating a plurality of individual rules in this manner, detector 21 can improve the accuracy of rule-based anomaly detection.

As described above, the server being the information processing device according to the present embodiment obtains individual rules generated by vehicles as items of information from the vehicles and integrates the individual rules obtained to generate an integrated rule. The information processing device is therefore capable of improving an accuracy of the rule-based anomaly detection more easily by using individual rules generated by vehicles.

Further, the server uses reliabilities obtained together with individual rules to adjust a degree of contribution of each individual rule to the integration of the individual rules. The information processing device is therefore capable of improving an accuracy of the rule-based anomaly detection more easily by using individual rules generated by a plurality of vehicles with their appropriate contributions.

Further, the server adjusts the degree of contribution of each individual rule by using a total number of items of data, a total mileage of a vehicle, a total travel time of the vehicle, or a total amount of data transmitted by the vehicle used for generating the individual rule, as reliability. The total number of items of data, the total mileage of a vehicle, the total travel time of the vehicle, and the total amount of data transmitted by the vehicle used for generating the individual rule are all types of information of which values increase as the vehicle is used for a longer time. Since the types of information that a vehicle conventionally holds are also used as reliability in this manner, the information processing device need not generate an additional type of information for calculating reliability. The information processing device is therefore capable of improving an accuracy of rule-based anomaly detection more easily by using the types of information that a vehicle conventionally holds for two purposes.

Further, the server uses a reliability generated based on a total number of items of data, a total mileage of a vehicle, a total travel time of the vehicle, or a total amount of data transmitted by the vehicle used for generating each individual rule to adjust a degree of contribution of the individual rule. The total number of items of data, the total mileage of a vehicle, the total travel time of the vehicle, and the total amount of data transmitted by the vehicle used for generating the individual rule are all types of information of which values increase as the vehicle is used for a longer time. Since the types of information that a vehicle conventionally holds are also used as reliability in this manner, the information processing device need not generate an additional type of information for calculating reliability. The information processing device is therefore capable of improving an accuracy of rule-based anomaly detection more easily by using the types of information that a vehicle conventionally holds for two purposes.

In the foregoing embodiments, the respective structural components are configured of dedicated hardware but may be realized by executing a software program suited to such structural components. Alternatively, the respective structural components may be implemented by a program executor such as a CPU or a processor reading out and executing the software program recorded in a recording medium such as a hard disk or a semiconductor memory. Here, the software program for implementing the information processing device, etc., described in each of the foregoing embodiments is a program such as that described below.

Specifically, the program causes a computer to execute an information processing method including: obtaining items of information including an item of frame information regarding a communication frame transmitted on an in-vehicle network of each of a plurality of vehicles; generating, using the items of information obtained, an integrated rule that is suitable for the plurality of vehicles and is for anomaly detection processing in the in-vehicle network; and outputting the integrated rule generated.

Although the information processing device, etc., according to one or more aspects has been described based on the foregoing embodiments, the present disclosure is not limited to the foregoing embodiments. The one or more aspects may therefore include forms obtained by making various modifications to the foregoing embodiments that can be conceived by those skilled in the art, as well as forms obtained by combining structural components in different embodiments, without departing from the essence of the present disclosure.

While various embodiments have been described herein above, it is to be appreciated that various changes in form and detail may be made without departing from the spirit and scope of the present disclosure as presently or hereafter claimed.

Further Information about Technical Background to this Application

The disclosures of the following patent applications including specification, drawings, and claims are incorporated herein by reference in their entirety: Japanese Patent Application No. 2019-199672 filed on Nov. 1, 2019 and PCT International Application No. PCT/JP2020/039194 filed on Oct. 16, 2020.

INDUSTRIAL APPLICABILITY

The present disclosure can be used in a processing device that detects, as an anomaly, unauthorized communication in an in-vehicle network.

The invention claimed is:

1. An information processing device, comprising:
an obtainer that obtains items of information, the items of information including an item of frame information regarding a communication frame transmitted on an in-vehicle network of each of a plurality of vehicles;
a generator that generates, using the items of information, an integrated rule that is suitable for the plurality of vehicles and that is for anomaly detection processing in the in-vehicle network of each of the plurality of vehicles; and
an outputter that outputs the integrated rule generated by the generator to the plurality of vehicles via a network, wherein
the obtainer obtains, as the item of frame information regarding the communication frame transmitted on the in-vehicle network of each of the plurality of vehicles, individual rules generated based on communication frames transmitted on the in-vehicle network of each of the plurality of vehicles,
the generator generates, as the integrated rule, a rule obtained by integrating the individual rules obtained by the obtainer,
when obtaining the items of information including the individual rules, the obtainer obtains reliability information together with the individual rules, the reliability information indicating reliability of the individual rules, and
when generating the integrated rule, the generator generates the integrated rule with the reliability information obtained together with the individual rules to adjust a degree of contribution of each of the individual rules to the integrated rule.

2. The information processing device according to claim 1, wherein
the obtainer obtains condition information indicating a condition pertaining to each of the plurality of vehicles at a time when the communication frame is transmitted on the in-vehicle network of each of a plurality of vehicles, and associates the condition information with the item of frame information,
the generator generates the integrated rule using the item of frame information associated with the condition information of each of the plurality of vehicles, among the items of information obtained by the obtainer, and
the outputter outputs the condition information together with the integrated rule.

3. The information processing device according to claim 1, wherein
the obtainer obtains, as the item of frame information transmitted on the in-vehicle network of each of the plurality of vehicles, (i) communication data indicating the communication frame transmitted on the in-vehicle network or (ii) log data of an in-vehicle device connected to the in-vehicle network, and
the generator generates, as the integrated rule, a rule stipulating a condition to be satisfied by the communication data or the log data obtained by the obtainer.

4. The information processing device according to claim 1, wherein
the reliability information includes (i) a total number of items of data used in generating the individual rules or (ii) a total mileage of a vehicle, a total travel time of the vehicle, or a total amount of data transmitted by the vehicle.

5. The information processing device according to claim 1, wherein
the reliability information is generated based on (i) a total number of items of data used in generating the individual rules or (ii) a total mileage of a vehicle, a total travel time of the vehicle, or a total amount of data transmitted by the vehicle.

6. An information processing method, comprising:
obtaining items of information, the items of information including an item of frame information regarding a communication frame transmitted on an in-vehicle network of each of a plurality of vehicles;
generating, using the items of information, an integrated rule that is suitable for the plurality of vehicles and that is for anomaly detection processing in the in-vehicle network of each of the plurality of vehicles; and
outputting the integrated rule to the plurality of vehicles via a network, wherein
the obtaining obtains, as the item of frame information regarding the communication frame transmitted on the in-vehicle network of each of the plurality of vehicles, individual rules generated based on communication frames transmitted on the in-vehicle network of each of the plurality of vehicles,
the generating generates the integrated rule as a rule obtained by integrating the individual rules,
the obtaining further obtains reliability information together with the individual rules, the reliability information indicating reliability of the individual rules, and
when generating the integrated rule, the information processing method further generates the integrated rule with the reliability information obtained together with the individual rules to adjust a degree of contribution of each of the individual rules to the integrated rule.

7. An information processing device, comprising:
a processor; and
a memory including a program that, when executed by the processor, causes the processor to perform operations, the operations including:
obtaining items of information, the items of information including an item of frame information regarding a communication frame transmitted on an in-vehicle network of each of a plurality of vehicles;
generating, using the items of information, an integrated rule that is suitable for the plurality of vehicles and that is for anomaly detection processing in the in-vehicle network of each of the plurality of vehicles; and
outputting the integrated rule to the plurality of vehicles via a network, wherein
the processor obtains, as the item of frame information regarding the communication frame transmitted on the in-vehicle network of each of the plurality of vehicles, individual rules generated based on communication frames transmitted on the in-vehicle network of each of the plurality of vehicles,
the processor generates, as the integrated rule, a rule obtained by integrating the individual rules obtained by the obtainer,
when obtaining the items of information including the individual rules, the processor obtains reliability information together with the individual rules, the reliability information indicating reliability of the individual rules, and
when generating the integrated rule, the processor generates the integrated rule with the reliability information obtained together with the individual rules to adjust a degree of contribution of each of the individual rules to the integrated rule.

8. The information processing device according to claim 7, wherein
the processor obtains condition information indicating a condition pertaining to each of the plurality of vehicles at a time when the communication frame is transmitted on the in-vehicle network of each of a plurality of vehicles, and associates the condition information with the item of frame information,
the processor generates the integrated rule using the item of frame information associated with the condition information of each of the plurality of vehicles, among the items of information obtained, and
the processor outputs the condition information together with the integrated rule.

9. The information processing device according to claim 7, wherein
the processor obtains, as the item of frame information transmitted on the in-vehicle network of each of the plurality of vehicles, (i) communication data indicating the communication frame transmitted on the in-vehicle network or (ii) log data of an in-vehicle device connected to the in-vehicle network, and
the processor generates, as the integrated rule, a rule stipulating a condition to be satisfied by the communication data or the log data obtained.

10. The information processing device according to claim 7, wherein
the reliability information includes (i) a total number of items of data used in generating the individual rules or (ii) a total mileage of a vehicle, a total travel time of the vehicle, or a total amount of data transmitted by the vehicle.

11. The information processing device according to claim 7, wherein
the reliability information is generated based on (i) a total number of items of data used in generating the individual rules or (ii) a total mileage of a vehicle, a total travel time of the vehicle, or a total amount of data transmitted by the vehicle.

* * * * *